United States Patent [19]

Hirayama et al.

[11] Patent Number: 4,662,911
[45] Date of Patent: May 5, 1987

[54] EQUIPMENT FOR TRAPPING PARTICULATES IN ENGINE EXHAUST GAS

[75] Inventors: Tsukasa Hirayama, Obu; Yukihisa Takeuchi, Aichi; Yasunao Miura, Kasugai, all of Japan

[73] Assignee: Nippondenso Co., Ltd., Kariya, Japan

[21] Appl. No.: 725,510

[22] Filed: Apr. 22, 1985

Related U.S. Application Data

[63] Continuation-in-part of Ser. No. 475,745, Mar. 16, 1983, abandoned.

[30] Foreign Application Priority Data

Mar. 18, 1982 [JP] Japan ................................ 57-043389
Jun. 28, 1982 [JP] Japan ................................ 57-110948

[51] Int. Cl.4 .......................... B01D 39/20; F01N 3/02
[52] U.S. Cl. ........................................ 55/282; 55/482;
55/523; 55/DIG. 10; 55/DIG. 30; 422/180
[58] Field of Search ............... 55/282, 482, 487, 466,
55/523, DIG. 10, DIG. 30; 210/510.1; 60/303,
311; 422/171, 178, 180

[56] References Cited

U.S. PATENT DOCUMENTS

| 4,211,075 | 7/1980 | Ludecke et al. | 60/311 |
| 4,258,099 | 3/1981 | Narumiya | 210/510.1 |
| 4,264,346 | 4/1981 | Mann | 55/523 |
| 4,276,071 | 6/1981 | Outland | 55/523 |
| 4,307,198 | 12/1981 | Oda et al. | 55/523 |
| 4,319,896 | 3/1982 | Sweeney | 60/311 |
| 4,346,557 | 8/1982 | Shadman et al. | 55/482 |
| 4,363,644 | 12/1982 | Sato et al. | 55/DIG. 30 |
| 4,404,007 | 9/1983 | Tukao et al. | 55/DIG. 30 |
| 4,456,457 | 6/1984 | Nozawa et al. | 60/311 |

FOREIGN PATENT DOCUMENTS

| 42301 | 12/1981 | European Pat. Off. | 55/DIG. 30 |
| 2802406 | 7/1979 | Fed. Rep. of Germany | 60/303 |
| 60874 | 5/1978 | Japan | 422/171 |
| 18016 | 2/1981 | Japan | 60/303 |

OTHER PUBLICATIONS

Howitt et al., "Cellular Ceramic Diesel Particulate Filter", SAE Technical Paper Series 1981.

Primary Examiner—David L. Lacey
Attorney, Agent, or Firm—Cushman, Darby & Cushman

[57] ABSTRACT

The invention relates to a trap for automotive exhaust particulates, with a high trapping efficiency and a low pressure loss for exhaust gas passage. The trap is a honeycomb-type filter with a three-dimensional network skelton. Further, provision of a ceramic incinerator comprising a heater in front of the honeycomb filter makes it easy to incinerate trapped particulates for removal.

9 Claims, 17 Drawing Figures

EQUIPMENT FOR TRAPPING PARTICULATES IN ENGINE EXHAUST GAS

This is a continuation-in-part of application Ser. No. 475,745, filed Mar. 16, 1983, which was abandoned upon the filing hereof.

Equipment for trapping particulates in engine exhaust gas and the manufacturing method thereof.

TECHNICAL FIELD

This invention relates to traps for exhaust carbon particulates from engines, particularly from diesel engines.

BACKGROUND OF THE INVENTION

Among conventional equipments of this kind is a trap described in U.S. Pat. No. 4,276,071. This trap, consisting of ceramic filter materials, has a honeycomb construction. A multiple of passages are provided along the longitudinal direction of the trap, and the ends of the passages are closed and opened alternately in both ends of the trap. Exhaust gas introduced to an inlet passage is made to be filtered through narrow gaps of a porous ceramic layer, which constitutes a wall adjacent to another passage. After a multiple of such filtering, the exhaust gas is made to flow out from the outlet side.

A similar equipment is also described in U.S. Pat. No. 4,264,346. The equipment is characterized by the fine structure of the porous ceramic material, which contains ceramic fibers within the foams.

The inventors have examined the conventional traps mentioned above, and noticed that the pressure loss of the exhaust gas passing through the walls of the traps is relatively high and the efficiency of particulate trapping is relatively small.

Further, in the conventional traps, an electric heater is installed on the inlet side of the trap to burn out the carbon particulates. However, carbon particulates in exhaust gas are mainly trapped during their passage through said partition walls which separate said multiple inlet passages from the outlet passages. The location where the largest amount of carbon particulates are trapped is not the inlet side of the filter but a place within the filter and at a distance apart from the inlet end. Although it may be thought to install this heater on the inlet side of the filter, the heat generated in the heater is readily lost by radiation loss. Therefore, ignition of carbon particulates is difficult at the inlet side of the filter.

The inventors have also recognized that the conventional method for manufacturing the honeycomb filter mentioned above is very complicated. Namely, the conventional method comprises the steps of extruding a mixture of ceramics powders and resin to form a rod-like green compact having a multiple of through holes provided along the longitudinal direction thereof, cutting the rod-like compact, closing each one of the both ends of the through holes alternately and sintering the resulting compact. Especially, the step of closing the through holes alternately is very difficult.

SUMMARY OF THE INVENTION

One of the objects of the present invention is to provide a honeycomb filter with a high trapping efficiency and a low pressure loss for exhaust gas passage.

Another object of the present invention is to provide a honeycomb filter which has an excellent ignitability.

Further object of the present invention is to provide an efficient method to manufacture said filters.

These objects of the present invention can be carried out by providing a trap in which there are a multiple of inlet passages that are open at their upstream or inlet ends and closed at the other ends, and a multiple of outlet passages that are closed at their upstream end and open at their outlet or downstream ends. The inlet passages are separated from the outlet passages by partition walls made of cellular ceramics having a three dimensional network-structured skelton.

An electric heater may be provided in a prefilter made of cellular ceramic which is installed on the exhaust gas inlet side of the honeycomb filter. The trap can be manufactured by impregnating a foamed plastic with a slurry containing fine ceramic powder, drying and sintering thereof.

These and other features and advantages of the invention will be more fully understood from the following description of certain preferred embodiments taken together with the accompanying drawings.

BEST MODE FOR CARRYING OUT THE INVENTION

Figure 1:
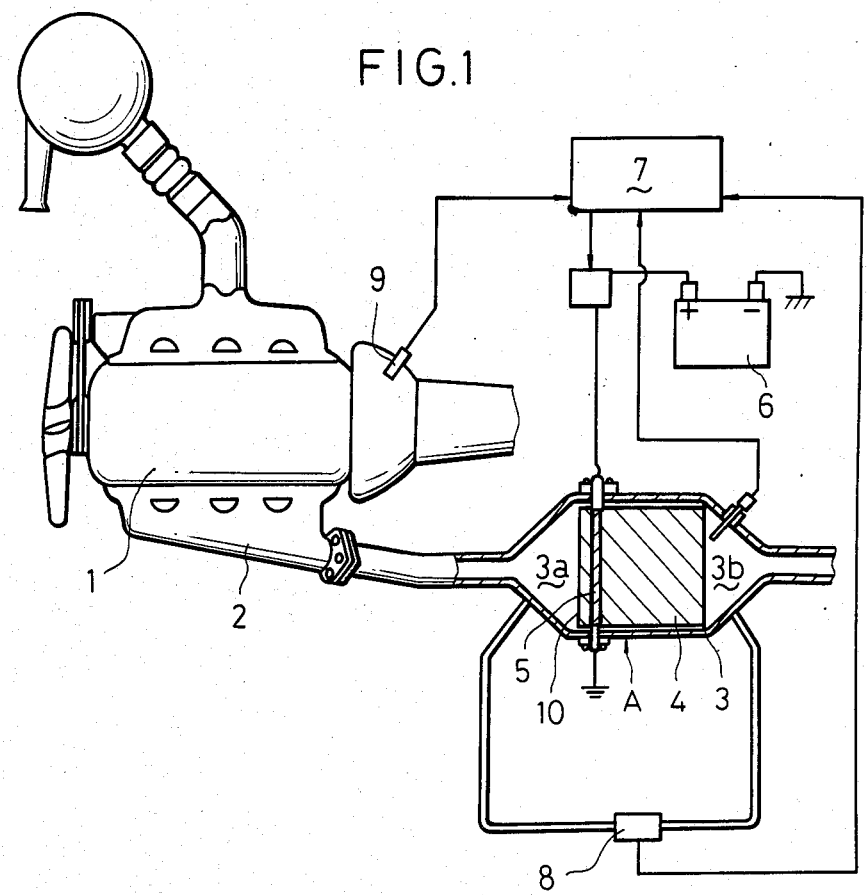
FIG. 1 is a partially sectional view to illustrate the mounting position of the particulate trapper in accordance with the present invention.

In FIG. 1, the particulate trapper A of the present invention is connected to an exhaust manifold 2 of an internal combustion engine, particularly a diesel engine 1. The equipment A comprises a metallic container 3, which has an inlet 3a for exhaust gas, connecting to the exhaust manifold 2, and an outlet 3b for the gas. The trap A includes a honeycomb structure filter 4 for trapping particulates, a prefilter 10 and an electric heater 5 provided between the prefilter 10 and the honeycomb filter 4. The electric heater 5 is provided to regenerate the filter 4 by incinerating the particulates trapped by the filter 4. Energizing of the heater 5 from a battery 6 is controlled by a control circuit 7. The control circuit 7 receives a signal from a differential pressure sensor 8 to detect the pressure drop across the trapper A and a signal from an rpm sensor 9 to detect the rotational speed of the engine. The exhaust gas from the engine 1 flows into the container 3 of the trapper A through the inlet 3a, passes the filters, 10 and 4, and flows out from the outlet 3b. During the passage of exhaust gas through the filters, 10 and 4, carbon particulates in the gas are trapped by the filters, 10 and 4, for removal.

When the flow resistance through the filter 4 is increased with more particulates trapped, the differential pressure sensor 8 exerts a signal corresponding to the pressure difference. The pressure difference between the upstream and downstream sides of the filter 4, which the sensor 8 detects, is also changed by the rotational speed of the engine. Therefore, the sensor circuit 7 determines a true flow resistance of the filter 4, by reference to a signal from the differential pressure sensor 8 and a signal from the rpm sensor 9. When the flow resistance, which corresponds to the amount of particulates so far trapped, reaches a predetermined value, electric current begins to be supplied to the electric heater 5. The heater 5 will be heated to a temperature, at which the trapped particulates, mainly comprising carbon, can burn.

Burning starts at the place where the electric heater 5 is installed. While the burning propagates to the upstream of the exhaust gas flow, it efficiently propagates to the downstream because the heat generated in the burning is preferentially transferred to the downstream together with the exhaust gas flow. Therefore, if the electric heater 5 is installed at the place where the particulate density around the upstream side of the filter 4 is the highest, that is, the rear side of the prefilter 10, ignition can be easily made, burning efficiently propagates across the entire filter 4 and the trapped particulates are burnt out. When the filter 4 is regenerated and the flow resistance is reduced by the removal of the particulates, current supply to the heater 5 is stopped. Of course, the particulates in the prefilter 10 are also removed during the above process.

Since, the electric heater 5 is installed on the rear side of the prefilter 10, in the present invention, the heat loss such as radiation is low for the heater 5 when it is heated. This means that smaller electric power is required to regenerate the filters 10 and 4. Because the electric heater 5 is located at a position where the density of the particulates trapped by the prefilter 10 is at the maximum, high efficiency is obtained in both ignition and burning. The electric heater 5 is mechanically strong since it is completely fixed to the rear side of the prefilter 10.

In the following, preferred construction of the equipments of the present invention will be explained with reference to several embodiments.

Figure 2:
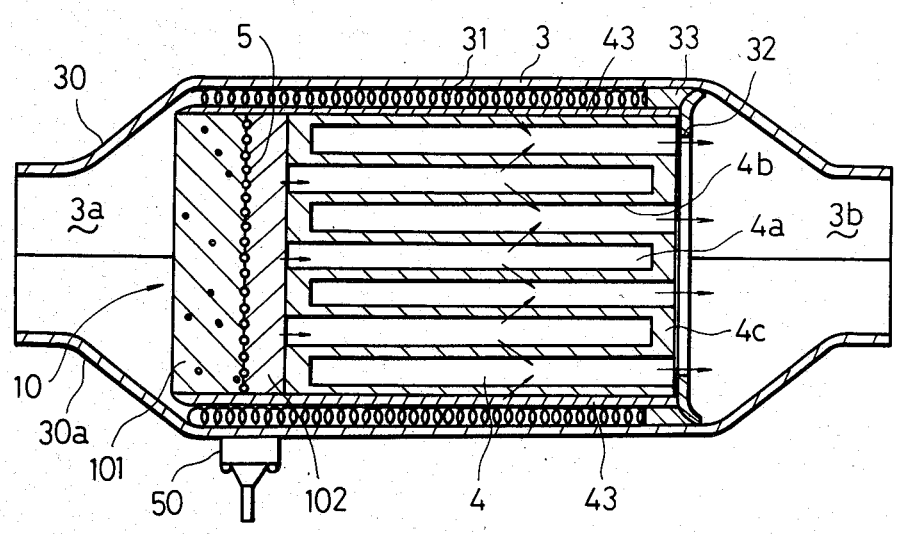
FIG. 2 is a sectional view of an embodied equipment in accordance with the present invention.

In the first embodiment illustrated in FIGS. 2-5, the metallic container 3 with an oval or circular section is a two-component container, which is constructed by bonding the edges of two container components 30, 30a, as shown in FIG. 2, through caulking with a press. The upstream and downstream ends of the container 3 are drawn to the exhaust gas inlet 3a and outlet 3b, respectively. On the inside surface of said container 3, is disposed a wire net 31 of a heat resistant metal, as a heat cushion material, in the interior of which are disposed the honeycomb filter 4 and the prefilter 10. The filter 4 has a honeycomb structure made of cellular ceramic with a three dimensional network structured skeleton and the prefilter 10 has a similar structure made of a similar cellular ceramic. The peripheries of the filters 4 and 10 are covered for protection with a stronger porous ceramic 43 which includes filter pores.

The said filter 4 is made to contact a fixed plate 32, which is rigidly fixed in the interior of the container 3. Thus, downstream movement of the filter 4 is inhibited. Between the wire net 31 and the fixed plate 32, is installed a heat-resistant seal 33, and, thus, all the exhaust gas is made to flow through the insides of the filters 4 and 10. The filter 10 consists of two filter components 101 and 102 between which is fixedly inserted the said electric heater 5. The said filter 10 is integrally bonded to the inlet end surface of said honeycomb filter 4.

The sizes of pores in the filters 101 and 102 are so appropriately selected as to trap carbon particulates and yet not to extremely increase the flow resistance, in due consideration of the axial lengths and sectional areas of the filters. Generally, 5-17 meshes are preferred but this range of pore size should not be necessarily obeyed.

Figure 3:
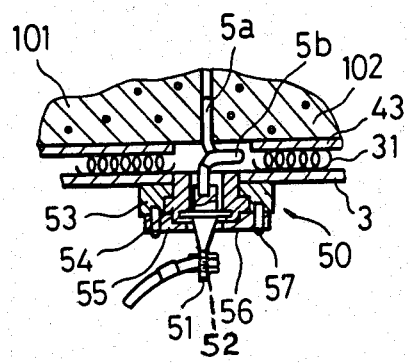
FIG. 3 is a sectional view showing the terminal structure of the electric heater of FIG. 2.
Figure 5:
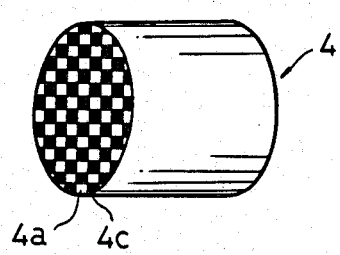
FIG. 5 is a pictorial view showing the honeycomb filter 4.
Figure 6:
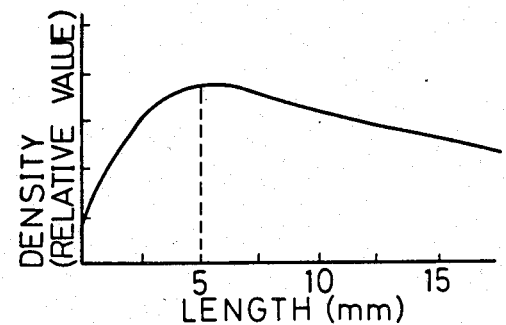
FIG. 6 is a characteristic diagram used for explaining the function of the present invention.

FIG. 6 shows a typical variation of the density of trapped carbon particulates along the longitudinal length for the filters 101 and 102 (cylindrical shape in 12 cm diameter, 13 mesh pore size) used in the present embodiment. As shown from the figure, the density is at its maximum at a distance of 5 mm from the upstream end of the filter. The distance of maximum density depends on the pore sizes of the filters 101 and 102 and the distance varies from 30 mm-3 mm for 5-20 mesh. The position where the density of trapped carbon particulates is the highest can be experimentally determined for various pore sizes of the filters 101 and 102. It is recommended to select the length of the filter 10 in order to install the electric heater 5 at a place with the highest density of particulates (3-30 mm from the inlet end of the filter 10). For example, appropriate distances may be 3, 10 and 30 mm for 20, 8 and 5 mesh of the pore size of the filter 10, respectively. Therefore, the longitudinal lengths and the pore sizes of the filters 101 and 102 can be selected to satisfy the above mentioned value. Although the axial length of the prefilter 10 can be determined from the flow resistance through the prefilter 10 and the honeycomb filter 4, the length is preferred to be about one-third of the axial length of the honeycomb filter 4. Both ends of the heater wire 5a of said electric heater 5 are connected to the terminals 51 of the terminal part 50 through the filter 10 and then further connected to the control circuit 7 (FIG. 1). The both ends of the heater wire 5a are bonded to form small rings 5b for stress absorption, and to prevent the heater wire 5a and the terminals 51 and 52 from being broken by vibration and the like. In the terminal part 50, as shown in FIG. 3, the base body 53 is welded to the outer surface of the container 3 and the terminals 51 and 52 are mounted on the inner surface through an insulating material 54. A packing 55 is made of an insulating material is also mounted and the cover 56 is fixed to the base body 53 by a screw. Although the structure of the honeycomb filter 4 may be easily understood from FIG. 2, it has the structure, as shown in FIG. 5, when viewed diagnonally. As indicated in the both figures, the filter 4 has a honeycomb construction, in which a multiple of passages 4a are partitioned by a multiple of walls 4b and the end of each passage 4a is alternately blocked in either end of the passage. (In FIG. 5, the hatched parts show the blocked ends). Therefore, exhaust gas entering the filter 4 passes through the partition walls 4b, as shown by the arrows in FIG. 2.

In the following, detailed explanation will be made of the methods for manufacturing said honeycomb filters 4 and 10. At first, description will be made of the forming die for manufacturing the honeycomb filter 4.

Figure 7A:
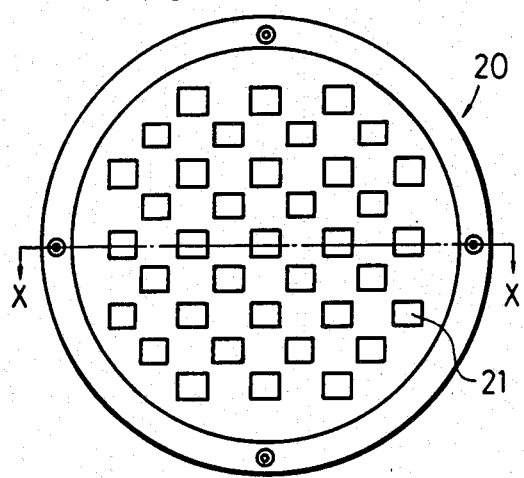
FIGS. 7(a), (b) and FIGS. 8(a), (b) show the dies used for manufacturing the honeycomb filter 4 of FIG. 2. Each (a) figure shows the plan view of each die. Each (b) figure shows X—X, or Y—Y sectional view of each die shown in each (a) figure.
Figure 7B:
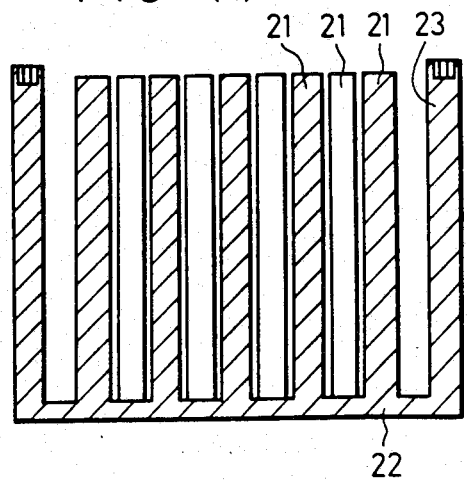
Figure 8A:
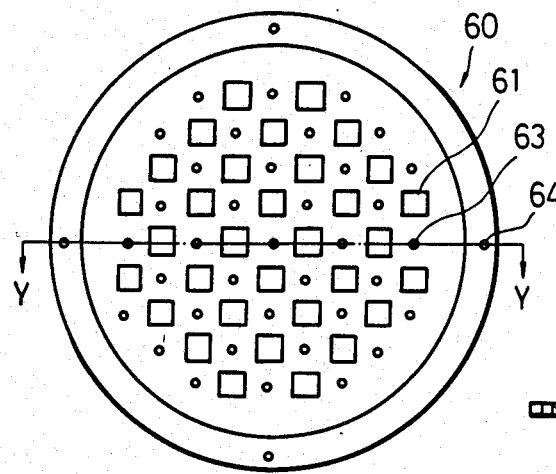
Figure 8B:
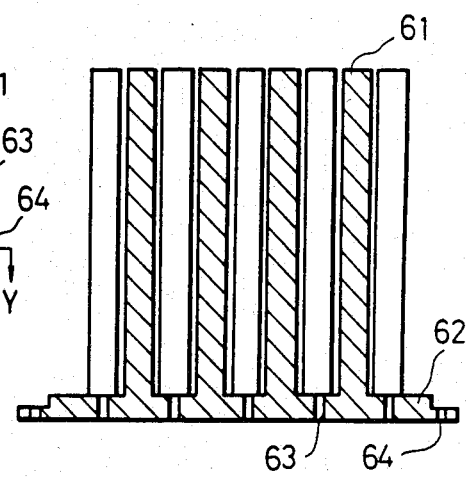
Figure 9:
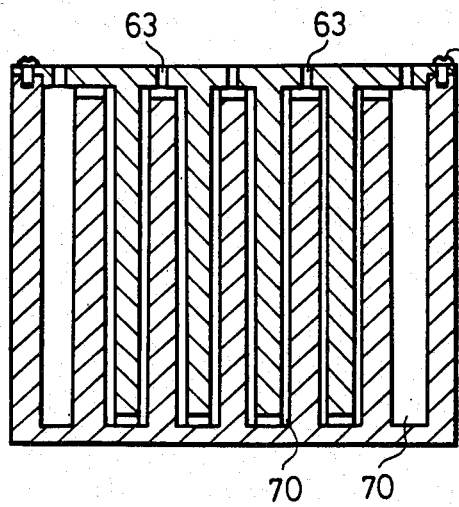
FIG. 9 is a sectional view of the combination of the dies of FIGS. 7 and 8.

FIG. 7 illustrates the container part of the forming die used in the present invention. FIG. 7(a) and FIG. 7(b) show the plane and sectional views respectively. The container part 20 of the die comprises a side wall 23 and an end portion 22, to which are alternately fixed columns 21 with a square section smaller than one section of a checkerboard pattern on the end 22. The other end of the die is open. On the other hand, FIGS. 8(a) and 8(b) show the lid of the forming die used in the present invention. FIG. 8(a) and FIG. 8(b) shows the plan and sectional views, respectively. The lid 60 comprises a plate lid 62, to which are perpendicularly fixed columns 61 with a square section, in the same manner as the container part 20 of the forming die. The columns 61 are fixed to checker pattern sections, to which columns 21 of the container part 20 of the die are not fixed. An open hole 63 is provided in each section of the lid plate 60 of the die and open holes 64 are also provided on the side periphery of the lid plate. Then, the forming die is made by combining the container part 20 and the lid part 60. FIG. 9 shows the axial section of the combined die. In the interior of the die is formed a cavity 70 with the same shape as the honeycomb filter 10 to be manufactured. The lid part 60 and the container part 20 are detachably fixed with screws 80 through the holes 64 provided on the periphery of the lid part 60 of the die. The raw liquid of urethane foam is poured through the holes 63, alternately selected, on the combined die in FIG. 9. A mold release agent is previously applied to the inside surface of the combined die. In pouring of the liquid, the air within the mold is vented out through other holes 63, thus helping easy pouring of the raw liquid of urethane foam. Then, urethane is foamed in the said cavity 70 and cured at 80° C. for 15-60 minutes. After the curing, when the container part 20 and the lid part 60 are disassembled, a urethane foam molding with a honeycomb structure is obtained. The urethane foam with a honeycomb structure, made by the above method, has thin membranes, called "cell walls", among the three dimensional frames. To remocve the cell walls, the urethane foam molding was placed in a container and a combustible gas and air or oxygen were introduced in it. Then, the gas mixture was ignited and thus, the cell walls were burnt and removed. The said urethan foam molding was dipped in a ceramic slurry, which was prepared by stirring the mixture of water, polyvinyl alcohl, and a mixture of MgO, $Al_2O_3$, $SiO_2$ powders, with such composition as to produce cordierite when the powders were calcined. Excess slurry was removed from the molding, which was then subjected to drying at 100°-120° C. The dripping and drying was repeated several times. Thus a green compact is formed. The green compact has multiple inlet and outlet passages. The method eliminates the necessity of closing alternately the open ends of the through holes of a green compact, as in the conventional method.

On the other hand, two cylindrical urethane foam moldings with their cell walls removed, were dipped in the same ceramic slurry as explained for the said honeycomb filter 4. Excess slurry was removed from the moldings, which were then dried at 100°-120° C. The dipping and drying was repeated several times. A spirally-wound heating wire with such composition as 21-23% Cr, 5.3-5.7% Al and balance Fe, was inserted between said urethane foam moldings coated with said slurry.

The honeycomb urethane foam molding impregnated with the slurry, described before, was press contacted with the urethane foam moldings, impregnated with the slurry and with the heating wire inserted between them, described in the above and they were sintered at 1300°-1400° C. for 2-6 hours, as they were in contact with each other.

Figure 4:
FIG. 4 is a pictorial view showing the structures of the filters 4 and 10 of FIG. 2.

Thus, the filters 4 and 10 are sintered to form an integral body, as shown in FIG. 2. Of course, the filter components, 101 and 102 of the filter 10 are integrated in the state where the heating wire 5a is inserted between the components. The filters 4 and 10 are composed of cellular ceramic with three dimensional network structured skeleton, as shown in FIG. 4. When the urethane material for the honeycomb filter 4 was foamed, the material is pressed against the insides of the container 20 and the lid 60 and the foam pores are crushed or extremely reduced, to form the said closed part 4c with sufficient degree of clogging.

In the following, the operation of the equipment in the present invention will be explained by use of FIG. 2. The exhaust gas emitted from a diesel engine (see FIG. 2) passes through the filter components 101 and 102 of the filter 10. Namely, the gas passes through the spaces formed among the three dimensional network structured skeleton (see FIG. 4) of the cellular ceramic which constitutes the filter components 101 and 102.

The exhaust gas which has passed through the filter 10, enters a multiple of passages 4a of the honeycomb filter 4 and flows to adjacent passages 4a through the partition walls 4b which have the structure as shown in FIG. 4. The exhaust gas passes through the spaces among the three dimensional network structured skeleton in the same way as in said filter components 101 and 102.

Carbon particulates in the exhaust gas collide with the three dimensional network structured skeletons of said filter components 4 and 10 and are trapped on said skeletons.

As illustrated in FIG. 6, the density of trapped carbon particulates is at its maximum within the filter 10. Since the electric heater 5 is installed at the place of the maximum density of the particulates, power supply to the electric heater 5 for generation of the trap will ignite and burn the carbon particulates at the place of their highest density. The burning particulates act as the fire source and the particulates trapped in the downstream of the source are then burnt. Therefore, the trapped particulates can be efficiently burnt out and removed.

One of the principal features of this invention is to provide the partition walls 4b of the honeycomb filter 4, with pore sizes which will not materially increase the pressure loss in passage of the exhaust through the filter while at the same time maintaining relatively high trapping efficiency. With this in mind, the pore size preferably is larger than the size of the particulates to be trapped so that the latter are trapped by collision trapping during passage of the exhaust through the partition walls. This has the further advantage of increasing the life of the filter by eliminating clogging by an accumulation of particulates at the surface of the upstream side of the partition walls.

For the foregoing reasons, pore size of the partition walls 4b may be of the order of from about 15 to about 100 mesh, but in practice this range is limited by the practical thickness of the partition walls.

It will be seen that the aforedescribed mold for making the honeycomb filter 4 is provided with a plurality of parallel columns 21 and 61 which interfit in laterally spaced relation to define the partition-wall-forming spaces in the mold. Since these columns are of relatively small cross-sectional area, it is very difficult to interfit the columns in exacty parallel spaced relation. Therefore, as a practical matter, it is practically impossible, with the aforedescribed mold, to provide the honeycomb filter with partition wall thicknesses of less than about 1.3 mm. Further, if the columns 21 and 61 are less than about 2 mm square in cross-sectional configuration, the strength of the column deteriorates. Thus, the size of the parallel passages in the honeycomb filter, as a practical matter, is larger than about 2 mm square.

Additionally, the strength of the partition walls is proportional to thickness but inversely proportional to pore size, so to maintain a practical strength with pore sizes in the desired range, the size of the pores varies, to some extent, with thickness.

Figure 14:
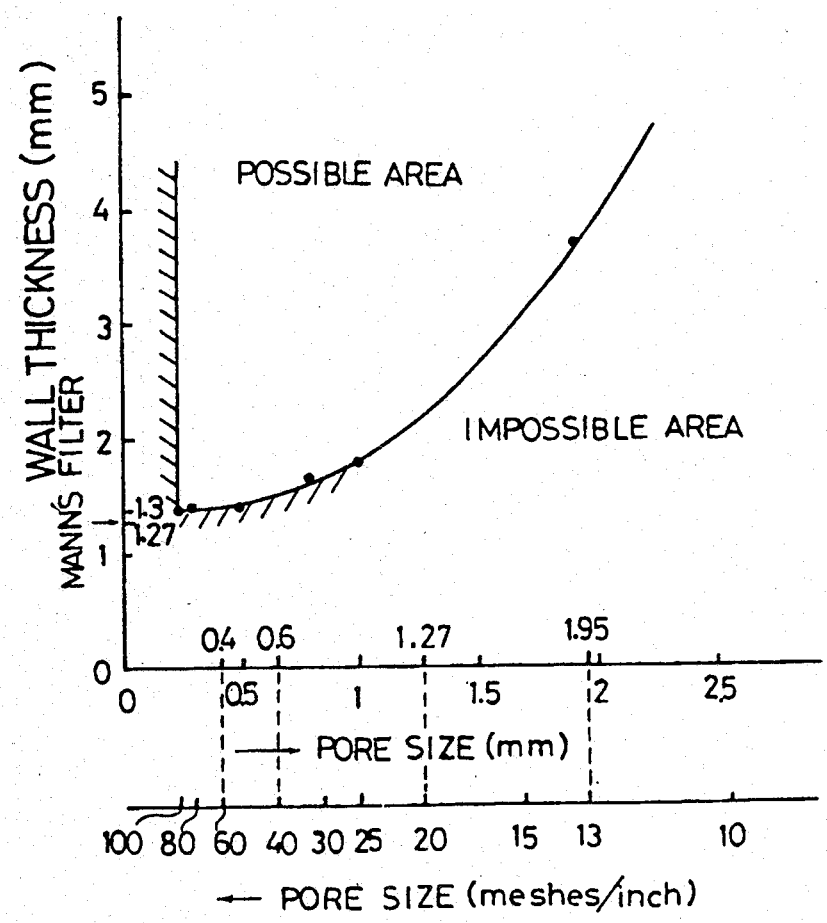
FIG. 14 is a graph showing the practical relation between pore size and partition wall thickness of a honeycomb filter embodying this invention.

The foreoing is illustrated in FIG. 14 which shows the practical relation between thickness of the partition walls and pore size of honeycomb filter embodying this invention. From FIGS. 14 and 15 it will be seen that the practical range of pore sizes is from about 40 to about 100 mesh and of wall thickness is from about 1.4 to about 7 mm. Imposed on the graph of FIG. 14 is a measurement of the thickness (1.27 mm or 0.05") of the partition walls of the honeycomb filter disclosed in the aforementioned U.S. Pat. No. 4,264,346, to Mann which shows that that thickness is too low to be practical in a honeycomb filter embodying this invention.

To illustrate the advantages of a filter embodying this invention with two types of conventional filters, comparative tests were made. The honeycomb filters of the present invention used in the tests were similar to that shown in FIG. 2. One of the conventional filters used in the tests was an extruded honeycomb filter similar to that described in the aforementioned U.S. Pat. No. 4,276,071 to Outland. The other conventional filter used in the tests was a sponge-like cellular filter similar to that described in the aforementioned U.S. Pat. No. 4,264,346 to Mann, but omitted the high temperature ceramic fibers described in that patent. All three filters used in the tests had the same cross-sectional area of 113 cm² and the same length of 15 cm. The pore sizes, wall thicknesses and length of the three filters used in the tests are shown in the following tabulation:

| | pore size | wall thickness | length |
|---|---|---|---|
| x—x conventional honeycomb-type trap | 70–100 μm | about 0.3 mm | 150 mm |
| o—o conventional foam-type trap | about 1.95 mm (13 meshes/inch) | no partition wall | 150 mm |

| | pore size | wall thickness | length |
|---|---|---|---|
| the Present Invention | about 1.27 mm (about 20 meshes/inch) | about 2 mm | 150 mm |

Automobiles with 2 liter engines were equipped with each of the three filters, and they were driven according to the mode: LA#4 as set forth in CFR 40 Chapter I—Environmental Protection Agency, page 669, Appendix I—Urban Dynamotor Schedules—(a) EPA Urban Dynamotor Driving Schedule for Light-Duty Vehicles and Light-Duty Trucks. Then the pressure loss for exhaust gas passage of each of the filters was measured on running at a speed of 60 km/hour and the filters were taken out of the automobiles for measuring the trapping efficiencies thereof. And again each automobile was equipped with each of the filters and the same examinations of running and measurements were repeated. The trapping efficiency was calculated by the following equation:

$$\text{trapping efficiency}(\%) = \frac{\text{trapped particulate}}{\text{whole exhaust particulate}} \times 100$$

Figure 11:
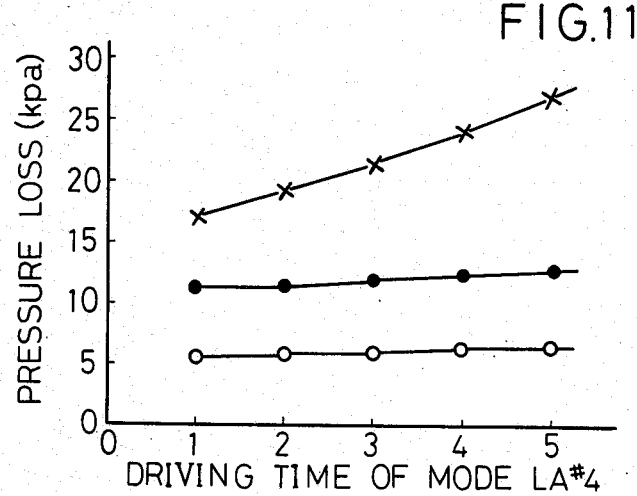
FIG. 11 is a graph showing the relations between the pressure loss of three kinds of filters and the driving time of mode LA#4.
Figure 12:
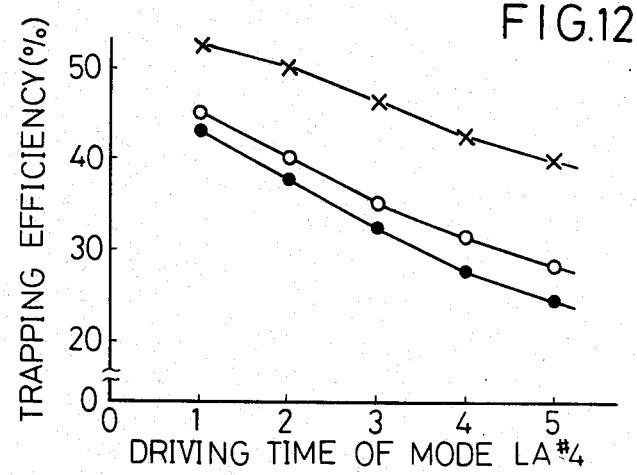
FIG. 12 is a graph showing the relations between the trapping efficiency of the filters and the driving time of the mode.
Figure 13:
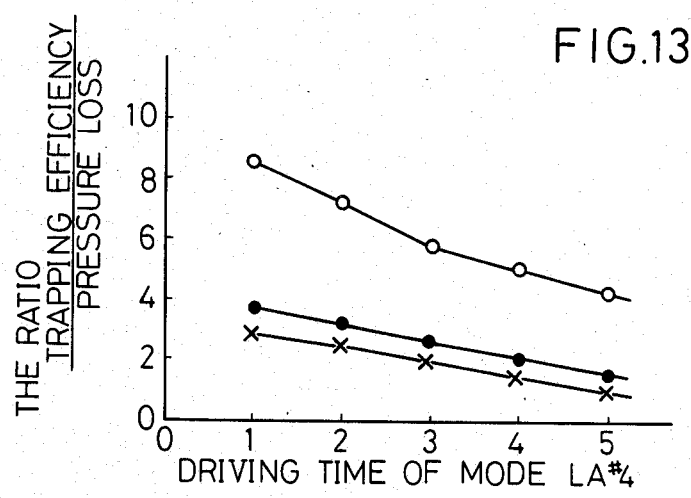
FIG. 13 is a graph showing the relations between the synthetic efficiency of the filters (the ratio of trapping efficiency to pressure loss) and the driving time of the mode LA#4.

The results of the measurements are shown in FIGS. 11–13.

In FIGS. 11–13, the white dots designate the values of the cellular honeycomb filter of the present invention: the black dots designate the values of the conventional sponge like cellular filter: the x-marks indicate values of the conventional type, extruded honeycomb filter. The trapping efficiency of the extruded honeycomb filter is the highest of the three, but its pressure loss is also the highest. The pressure loss of the sponge like cellular filter is rather high. The cellular honeycomb filter of the present invention has a low pressure loss, and the highest trapping efficiency as shown in FIG. 13.

Figure 15:
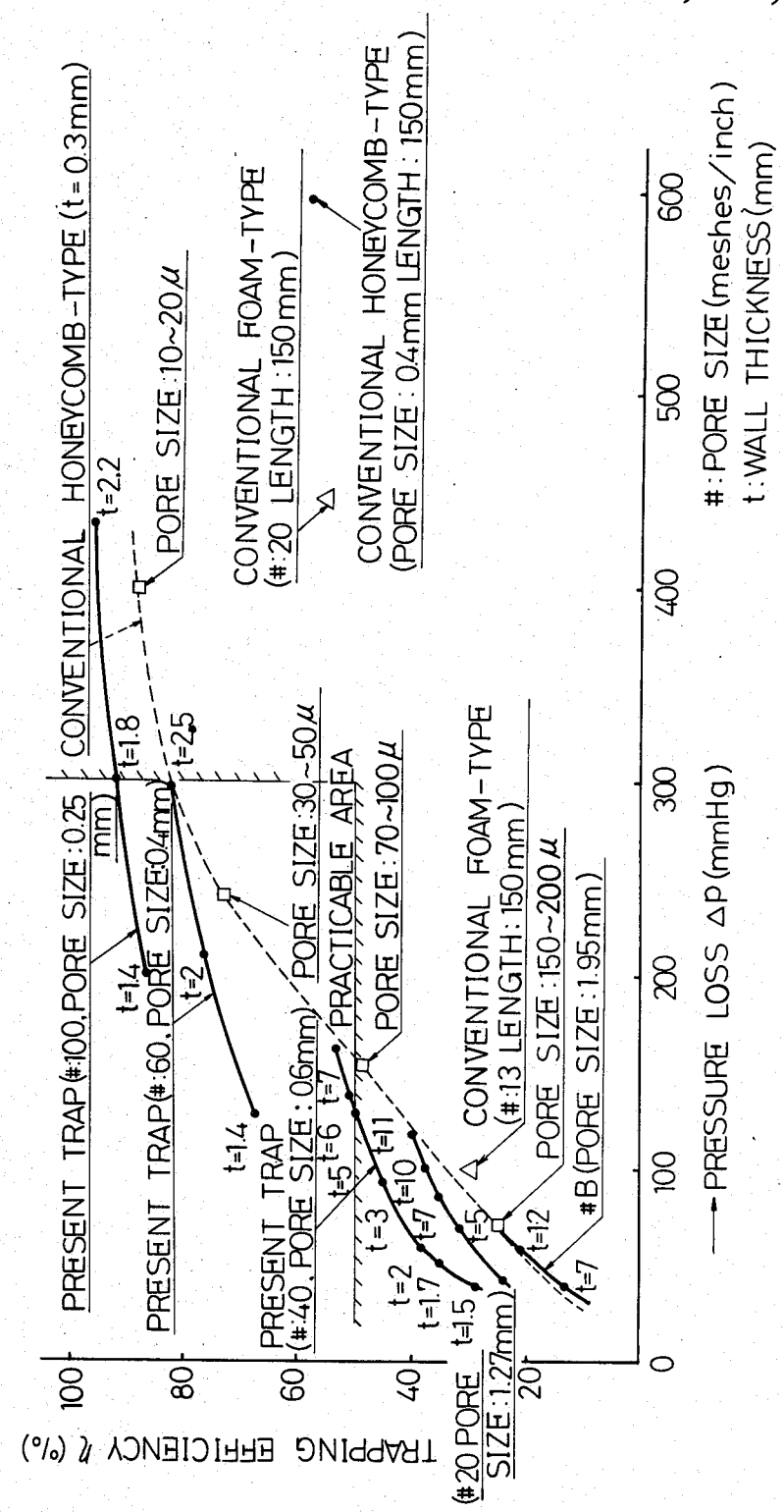
FIG. 15 is a graph showing the relation between trapping efficiency and pressure loss for different pore sizes of filters according to the prior art and according to this invention.

Other tests were made to compare trapping efficiency with pressure loss of several conventional honeycomb type traps having different pore sizes (pore size: 10–20μ, 30–50μ, 70–100μ and 150–200μ) and several conventional foam-type traps with honeycomb filters of the present invention having different pore sizes and different partition wall thicknesses. The test were made with a 6 kgm engine and the pressure loss and trapping efficiency were measured after three hours driving at 200 rpm. The results are shown in FIG. 15.

It will be seen that as compared with the conventional honeycomb type trap, a trap embodying the present invention, although having partition walls with relatively large pore sizes, eg. in the range of from about 40 to about 100 mesh, has the higher trapping efficiency. As compared with the conventional foam-type trap, the trap of this invention shows high trapping efficiency and relatively low pressure loss.

With a 2.2 l-engine, trapping efficiency of a filter embodying this invention with practical wall thicknesses and pore sizes is more than 50%, and the pressure loss thereof is less than 300 mmHg. Wall thicknesses and pore sizes of the present trap which are in the practicable area are as follows:

| PORE SIZE ≠(meshes/inch) | WALL THICKNESS t (mm) |
| --- | --- |
| about 40 | about 5.0 to about 7 |
| about 60 | about 1.4 to about 2.5 |
| about 100 | about 1.4 to about 1.8 |

In addition, numerous modificsations and changes such as the followings can be made in accordance with the present invention without being limited by the embodiments so far described.

Figure 10:
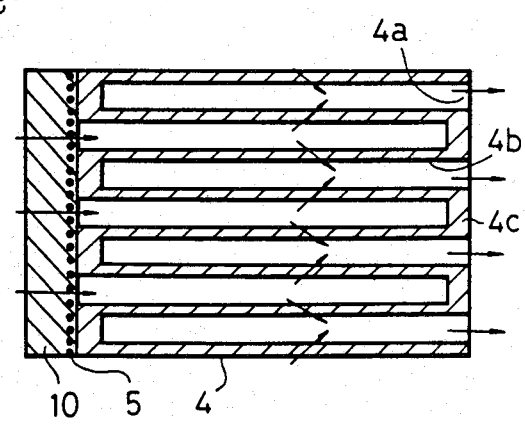
FIG. 10 is a sectional view of another embodiment in accordance with the present invention.

(1) The filter may be of a single layer structure, as shown in FIG. 10.
(2) The honeycomb filter 4 and the filter 10 may be separately manufactured beforehand and then bonded with ceramic adhesive to be integrated by further sintering.
(3) The filter 10 may be of a conventional honeycomb structure.
(4) Ceramic such as SiC, $MoSi_2$, $TiC-Al_2O_3$ system or $TiC-TiN-Al_2O_3$ system, is also usable as the material for the electric heater 5. A suitable metal other than that of the embodiment described above is also usable for the electric heater.
(5) Various ceramic materials other than cordierite may be used as the materials of the filters 4 and 10.
(6) The filters 4 and 10 are not necessarily required to be integrated.
(7) The cross section of the longitudinal passages formed within a ceramic can be shaped in such as circle, regular triangle, square and hexagon, but is not necessarily limited to such shapes.

What is claimed is:

1. A trap for automotive exhaust particulates comprising: a honeycomb filter body having a plurality of thin gas filtering internal walls defining a plurality of parallel inlet passages open at one end of said main filter body and closed at the other end and a plurality of parallel outlet passages closed at said one end and open at said other end, each of said internal walls lying between said inlet passages and said outlet passages and forming a filtration structure for gas flow therethrough from said inlet passages to said outlet passages, said internal walls being made of cellular ceramics having a three-dimensional network skeleton with a pore size in a range of the order of from about 40 mesh to about 100 mesh for collision trapping of the particulates sand the thickness of said internal walls being somewhat proportional to pore size and in a range of the order of from about 1.4 mm to about 7 mm.

2. A trap according to claim 1, wherein said trap further comprises a prefilter integrally combined on said one end of the filter body and an electric heater installed within the prefilter.

3. A trap according to claim 2, wherein the prefilter is made of cellular ceramics having a three dimensional network skeleton the pore size of the prefilter is from about 5 mesh to about 20 mesh, said prefilter has an inlet end opposite said one end and the heater is installed within the prefilter at a distance of from 3 mm to 30 mm from the inlet end of the prefilter.

4. A trap corresponding to claim 1 in which the pore size is about 40 mesh and the wall thickness is from about 5.0 mm to about 7.0 mm.

5. A trap according to claim 1 in which the pore size is about 60 mesh and the wall thickness is from about 1.4 mm to about 2.5 mm.

6. A trap according to claim 1 in which the pore size is about 100 mesh and the wall thickness is from about 1.4 mm to about 1.8 mm.

7. A trap according to claim 1 wherein the pore size is of the order of from about 40 mesh to about 60 mesh.

8. A trap according to claim 1 including a prefilter body combined integrally with the one end of the filter body, said prefilter body also being made of cellular ceramics having a three-dimensional network skeleton with a pore size of the order of from about 5 meshes/inch to about 20 meshes/inch for collision trapping of the particulates.

9. A trap for automotive internal combustion engine, especially diesel engine, exhaust particulates comprising:
a container having an inlet adapted to be connected to the exhaust manifold of the engine and an outlet; and
a honeycomb filter body disposed in said container for flow of exhaust therethrough from said inlet to said outlet, said body having a plurality of thin gas filtering internal walls defining a plurality of parallel inlet passages open to said inlet at one end of said filter body and closed to said outlet at the other end and a plurality of parallel outlet passages closed to said inlet at said one end and open to said outlet at said other end, each of said internal walls lying between said inlet passages and said outlet passages and forming a filtration structure for gas flow therethrough from said inlet passages to said outlet passages, said internal walls being made of cellular ceramics having a three-dimensional network skeleton with a pore size of the order of from about 40 mesh to about 100 mesh for collision trapping of the particulates and the thickness of said internal walls being somewhat proportional to pore size and in a range of from about 1.4 mm to about 7 mm.

* * * * *